TRANSISTOR MIXING CIRCUIT

Filed June 24, 1953

INVENTOR
ADRIANUS JOHANNES WILHELMUS
MARIE VAN OVERBEEK
BY [signature]
AGENT

United States Patent Office 2,775,705

Patented Dec. 25, 1956

2,775,705

TRANSISTOR MIXING CIRCUIT

Adrianus Johannes Wilhelmus Marie Van Overbeek, Eindhoven, Netherlands, assignor to Hartford National Bank and Trust Company, Hartford, Conn., as trustee Application June 24, 1953, Serial No. 363,889

3 Claims. (Cl. 250—36)

This invention relates to a mixing circuit utilising a transistor coupled with a resonant circuit to provide self-oscillation of said transistor. Circuits are already known comprising a transistor which is caused to selfoscillate by including in its base circuit a parallel resonant circuit. It appears that the oscillator amplitude may be modulated according to the signal by varying the voltage between the emission electrode and the base electrode in the rhythm of a signal oscillation. Consequently, if a parallel resonant-circuit tuned to the desired mixed product is included in the circuit between the base electrode and the collector electrode, the desired oscillation may be derived therefrom. However, it appears that the oscillation may be detrimentally affected by the said circuit.

The obect of the invention is to provide a particular modification of this and similar circuits which avoid the said disadvantage, while nevertheless exhibiting satisfactory mixing properties.

According to the invention, the biasing potential of the base electrode is adjusted to a value located between the two curvatures in the curve representing the base current as a function of the base voltage, the value of an impedance included in the base circuit being such at the oscillator frequency that the instantaneous value of the local oscillation considerably exceeds the two curvatures, while the oscillation obtained by mixing with double the oscillator frequency is derived from a parallel resonant circuit included in the circuit between the base electrode and the collector electrode and tuned to the oscillation concerned.

In order that the invention may be more clearly understood and readily carried into effect, it will now be described with reference to the accompanying drawing, given by way of example, in which.

Figure 1:
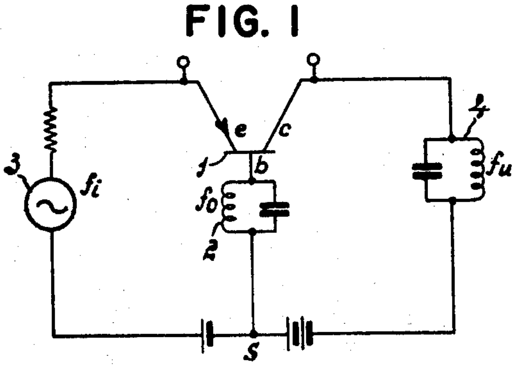
Fig. 1 shows one embodiment of the invention.

The circuit shown in Fig. 1 comprises a transistor 1 having an emission electrode $e$, a collector electrode $c$ and a base electrode $b$. The said electrodes are interconnected by way of impedances which meet at a star point $s$. The circuit between the emission electrode 1 and the star point $s$ is termed emission circuit, the circuit between the collector electrode $c$ and the star point $s$ is termed collector circuit and the circuit between the base electrode $b$ and the star point $s$ is called the base circuit of the transistor.

The base circuit includes a parallel resonant circuit 2 having an impedance such that the transistor is caused to self-oscillate in known manner. The oscillation of frequency $f_o$ thus produced is mixed with a signal oscillation $V_i$ of frequency $f_i$, originating from a source 3, which is supplied to the emission circuit and correspondingly modulated in amplitude. The desired mixed product is derived from a parallel resonant output circuit 4 included in the collector circuit and having a high impedance for at least one of the mixing frequencies of $f_o$ and $f_i$. If the circuit 4 would also have a material impedance for the oscillator frequency $f_o$, this would result in the oscillation being detrimentally affected, since any impedance in the collector circuit would bring about negative backcoupling of the transistor.

According to the invention, the circuit 4 is tuned to the frequency $f_u$ of the mixed product obtained by mixing with double the oscillator frequency $f_o$ and hence $f_u=2f_o$ or $f_u=2f_o \pm f_i$, the resonance impedance of the circuit 2 being chosen such that the instantaneous value of the local oscillation considerably exceeds the two curvatures in the curve representing the base current $i_b$ as the function of the base voltage $V_b$.

Figure 2:
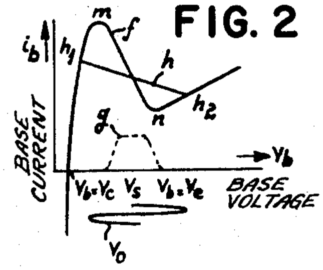
Fig. 2 shows a base current-base voltage curve of a transistor used in the circuit of Fig. 1.

In Fig. 2 this curve is represented by the curve $f$ at constant value of the emission-electrode bias $V_e$ or the collector-electrode bias $V_c$. It exhibits two points of curvature $m$ and $n$ which, as a rule, occur as a maximum ($m$) and a minimum ($n$) of the current $i_b$. The biasing potential of the base electrode $b$ is chosen at a value $V_s$ located at a point approximately midway between the points of curvature $m$ and $n$, the amplification of the transistor as represented by the curve $g$ in Fig. 2 being fairly considerable, while the resonance impedance of the circuit 2 corresponds to the slope of the line $h$ in Fig. 2. The amplitude of the local oscillation $V_o$ thus swings about the bias voltage value $V_s$ and reaches an instantaneous value in the vicinity of the points of intersection $h_1$ and $h_2$ of the curves $h$ and $f$, where the amplification is in practice nil. Thus, the points of curvature $m$ and $n$ in the curve $f$ are in this case considerably exceeded.

Figure 3:
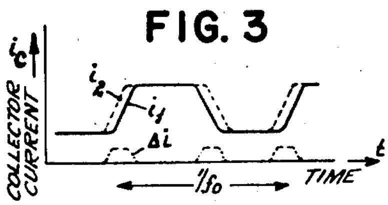
Fig. 3 shows the collector-current of the said transistor as a function of time.

In Fig. 3, the collector current $i_c$ is shown by the full line $i_1$ as a function of the time $t$ at suitably chosen conditions at which the local oscillation $V_o$ exceeds the curvatures $m$ and $n$ approximately to the same extent. If the emission voltage resulting from the signal voltage $V_i$ increases, a collector current flows, for example, according to the dotted line $i_2$. The corresponding increase in current $\Delta i$ has a strong component of the frequency $2f_o$, as may be seen from the figure. It is to be noted that the current $i_1$ itself is substantially free from a component of the frequency $2f_o$.

Consequently, the modulation of the second harmonic of the local oscillation $f_o$ is considerable, more particularly at the adjustment mentioned before, which renders the circuit suitable for mixing with the second harmonic. For this purpose the circuit 4 has, in the collector circuit, a high impedance for at least one of the mixing frequencies $2f_o-f_i$ or $2f_o+f_i$ and a low impedance for the oscillator frequency $f_o$ itself. It is tuned to a frequency $f_u=2f_o$ if the whole mixed product is desired, or to $2f_o+f_i$ or $2f_o-f_i$ if one side-band only or frequency transposition of the signal oscillations $f_i$ is desired. Since the circuit 4 at the oscillator frequency $f_o$ only has a low impedance, the transistor is caused to selfoscillate in a considerably simpler manner by avoiding collector impedance backcoupling.

Figure 4:
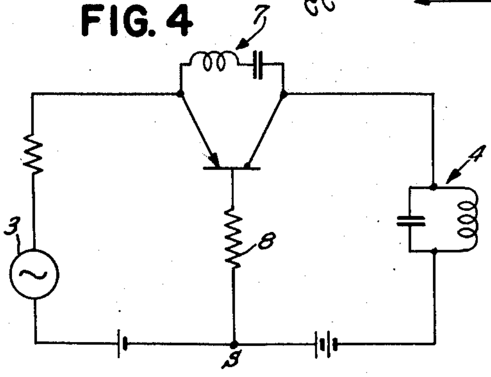
Fig. 4 shows an alternative embodiment of the invention.

Instead of the aforementioned known method of causing selfoscillation of the transistor 1 with the use of the base circuit 2, the invention is also applicable to those cases in which selfoscillation is brought about in a different way. More particularly it is possible, for example, for a series-circuit 7 tuned to the oscillator frequency $f_o$ to be included between the emission electrode $e$ and the collector electrode $c$ and, if desired, for the base circuit 2 to be then substituted or bridged by a resistor 8 of sufficient value to lead to self-oscillation, as shown in Fig. 4.

What is claimed is:

1. A mixing circuit comprising a transistor having a base electrode, a collector electrode and an emission electrode and having a base current-base voltage characteristic curve exhibiting two points of curvature of which one is at a relatively maximum value of base current and the other is at a relatively minimum value of base current, said base electrode having a biasing potential having a value located at a point substantially midway between said two points of curvature of said curve, a resonant circuit connected to an electrode of said transistor, means interposed between said base electrode and said emission electrode for providing a signal voltage, an impedance connected to said base electrode providing for self-oscillation of said transistor at the resonant frequency of said resonant circuit, said impedance having a value at the frequency of said self-oscillation at which the instantaneous value of said self-oscillation exceeds said two points of curvature, and a parallel resonant output circuit interposed between said base electrode and said collector electrode tuned to a frequency corresponding to a mixed product of twice the frequency of said self oscillations and the frequency of said signal voltage.

2. A mixing circuit comprising a transistor having a base electrode, a collector electrode and an emission electrode and having a base current-base voltage characteristic curve exhibiting two points of curvature of which one is at a relatively maximum value of base current and the other is at a relatively minimum value of base current, said base electrode having a biasing potential having a value located at a point substantially midway between said two points of curvature of said curve, a first parallel resonant circuit connected to the base electrode of said transistor, said resonant circuit providing self-oscillation of said transistor and having an impedance having a value at the frequency of said self-oscillation at which the instantaneous value of said self-oscillation exceeds said points of curvature, means interposed between said base electrode and said emission electrode for providing a signal voltage, and an output circuit comprising a second parallel resonant circuit interposed between said base electrode and said collector electrode and tuned to a frequency corresponding to a mixed product of twice the frequency of said self oscillations and the frequency of said signal voltage.

3. A mixing circuit comprising a transistor having a base electrode, a collector electrode and an emission electrode and having a base current-base voltage characteristic curve exhibiting two points of curvature of which one is at a relatively maximum value of base current and the other is at a relatively minimum value of base current, said base electrode having a biasing potential having a value located at a point substantially midway between said two points of curvature of said curve, a resonant circuit and an impedance connected to and providing self-oscillation of said transistor, said resonant circuit including a series circuit tuned to the frequency of said self-oscillation and interposed between said emission electrode and said collector electrode and said impedance being coupled to said base electrode and having a value at the frequency of said self-oscillation at which the instantaneous value of said self-oscillation exceeds said two points of curvature, and a parallel resonant output circuit interposed between said base electrode and said collector electrode and tuned to a frequency corresponding to a mixed product of twice the frequency of said self oscillations and the frequency of said signal voltage.

References Cited in the file of this patent

UNITED STATES PATENTS

| | | |
|---|---|---|
| 2,570,939 | Goodrich | Oct. 9, 1951 |
| 2,666,902 | Koros | Jan. 19, 1954 |
| 2,713,117 | Haegile | July 12, 1955 |

FOREIGN PATENTS

| | | |
|---|---|---|
| 678,317 | Great Britain | Sept. 3, 1952 |

OTHER REFERENCES

Article, "Transistor Oscillators," pages 369–385 of RCA Review for September 1952.